United States Patent [19]
Yoshida

[11] Patent Number: 6,050,600
[45] Date of Patent: Apr. 18, 2000

[54] AIR BAG ASSEMBLY HAVING AN INTEGRAL EXTERIOR NOZZLE

[75] Inventor: Ryoichi Yoshida, Echi-gun, Japan

[73] Assignee: Takata Corporation, Tokyo, Japan

[21] Appl. No.: 09/021,148

[22] Filed: Feb. 10, 1998

Related U.S. Application Data

[60] Provisional application No. 60/037,516, Feb. 10, 1997.

[51] Int. Cl.[7] .................................................. B60R 21/28
[52] U.S. Cl. ........................................ 280/740; 280/743.1
[58] Field of Search ................................ 280/740, 743.1

[56] References Cited

U.S. PATENT DOCUMENTS

| | | | |
|---|---|---|---|
| 5,375,878 | 12/1994 | Ellerbrok | 280/743.1 |
| 5,419,579 | 5/1995 | McPherson et al. | 280/743.1 |
| 5,421,607 | 6/1995 | Gordon | 280/743.1 |
| 5,503,429 | 4/1996 | Wallner et al. | 280/743.1 |
| 5,529,340 | 6/1996 | Fairbanks | 280/743.1 |
| 5,549,326 | 8/1996 | Rodriguez Ramos | 280/743.1 |
| 5,566,972 | 10/1996 | Yoshida et al. | 280/743.1 |
| 5,577,765 | 11/1996 | Takeda et al. | 280/729 |
| 5,697,636 | 12/1997 | Orme et al. | 280/743.1 |

FOREIGN PATENT DOCUMENTS

| | | |
|---|---|---|
| 1 370 441 | 10/1974 | United Kingdom . |
| 2 251 222 | 7/1992 | United Kingdom . |
| WO 96/15923 | 5/1996 | WIPO . |

*Primary Examiner*—Kenneth R. Rice
*Attorney, Agent, or Firm*—Foley & Lardner

[57] ABSTRACT

An air bag assembly includes an inflatable bag which has an entrance for receiving pressurized gas. The entrance of the inflatable bag is connected with an outlet of a nozzle disposed integrally with and at an exterior of the inflatable bag. The pressurized gas is transmitted into the inflatable bag through the nozzle. An inlet of the nozzle is provided with a mouthpiece through which pressurized gas is injected.

20 Claims, 9 Drawing Sheets

AIR BAG ASSEMBLY HAVING AN INTEGRAL EXTERIOR NOZZLE

This application claims benefit of priority of U.S. provisional application Ser. No. 60/037,516 filed Feb. 10, 1997.

BACKGROUND OF THE INVENTION

1. Field of the Invention

The invention relates generally to passenger restraint systems and more particularly to an air bag assembly which has a nozzle mounted integrally to an exterior of an inflatable air bag.

2. Description of the Related Art

Conventional air bag assemblies typically include an inflatable air bag and a gas generator mounted within the inflatable air bag. In such typical conventional air bag assemblies, pressurized gases are directed through injection ports of the gas generator.

In the conventional air bag assemblies which have a gas generator mounted outside of the inflatable bag, pressurized gases are introduced into the inflatable bag either directly or through a separate gas conduit which is not an integral component of the air bag assembly.

SUMMARY OF THE INVENTION

An object of the invention is to provide an automobile passenger restraint system which includes an air bag assembly having a nozzle integrally attached to an exterior of an inflatable air bag.

Another object of the invention is to provide an air bag assembly having a nozzle which is flexible.

Still another object of the invention is to provide an air bag assembly having a nozzle shaped asymmetrically.

Still another object of the invention is to provide an air bag assembly which permits the inflatable air bag to be folded in a variety of unique patterns.

The above and other objects of the invention are accomplished with an air bag assembly including an inflatable bag having an entrance for receiving pressurized gas. The entrance of the inflatable bag is connected with an outlet of a nozzle disposed integrally with and at an exterior of the inflatable bag. The pressurized gas is transmitted into the inflatable bag through the nozzle. An inlet of the nozzle is provided with a mouthpiece through which pressurized gas is injected.

In other embodiments of the invention, the nozzle is flexible, or is shaped asymmetrically with respect to an axis normal to the entrance of the inflatable air bag. Further, a diffuser, which is disposed within an interior of the inflatable air bag and which is connected with the entrance of the inflatable air bag, can be provided.

Additional objects and advantages of the invention will be set forth in the description which follows. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate the preferred exemplary embodiments of the invention, and, together with the general description given above and the detailed description of the preferred embodiments given below, serve to explain the principles of the invention, in which.

DETAILED DESCRIPTION OF THE PREFERRED EMBODIMENT

Figure 1:
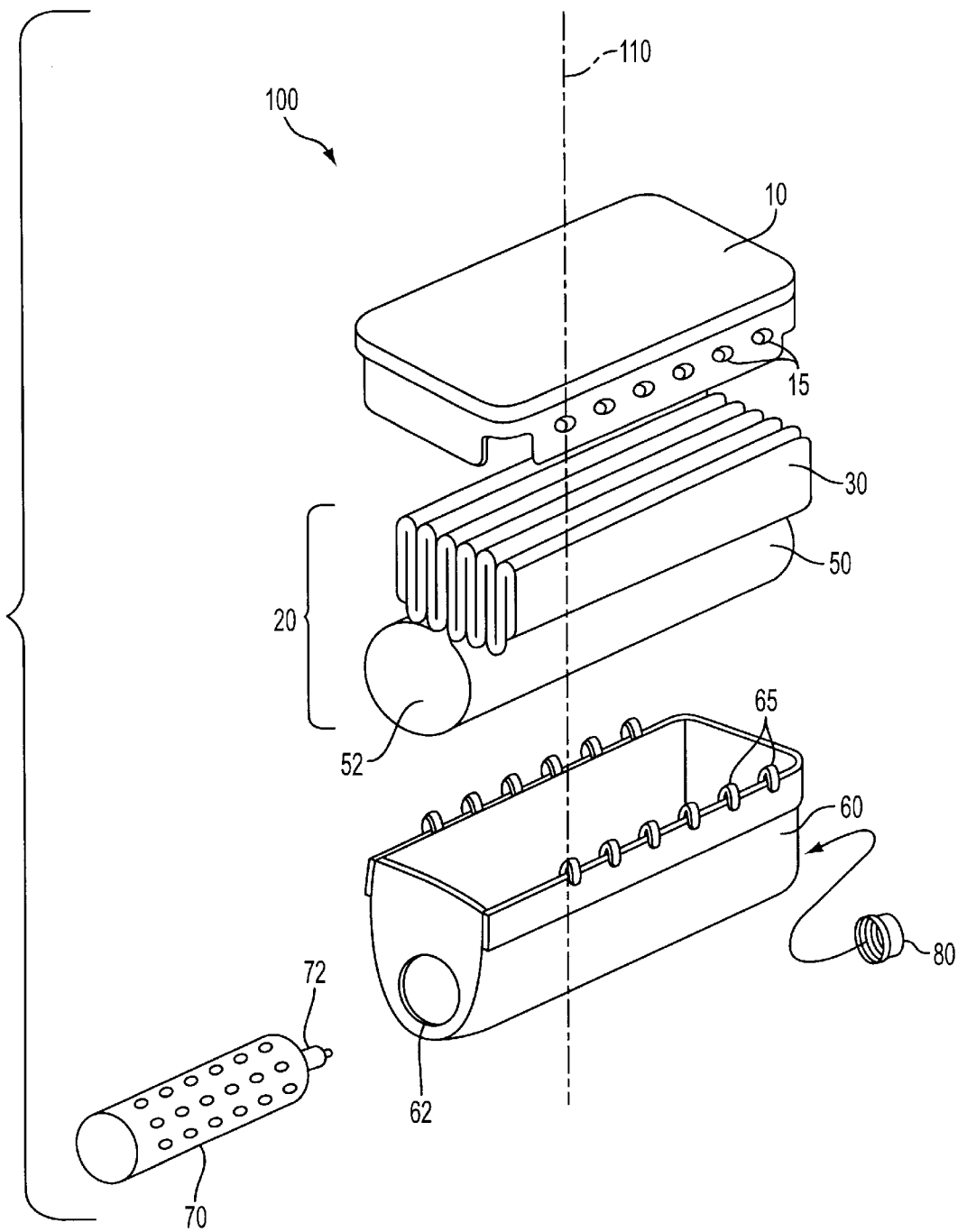
FIG. 1 is an exploded view of an air bag assembly and other components of an air bag module of a passenger restraint system according to the invention.
Figure 2:
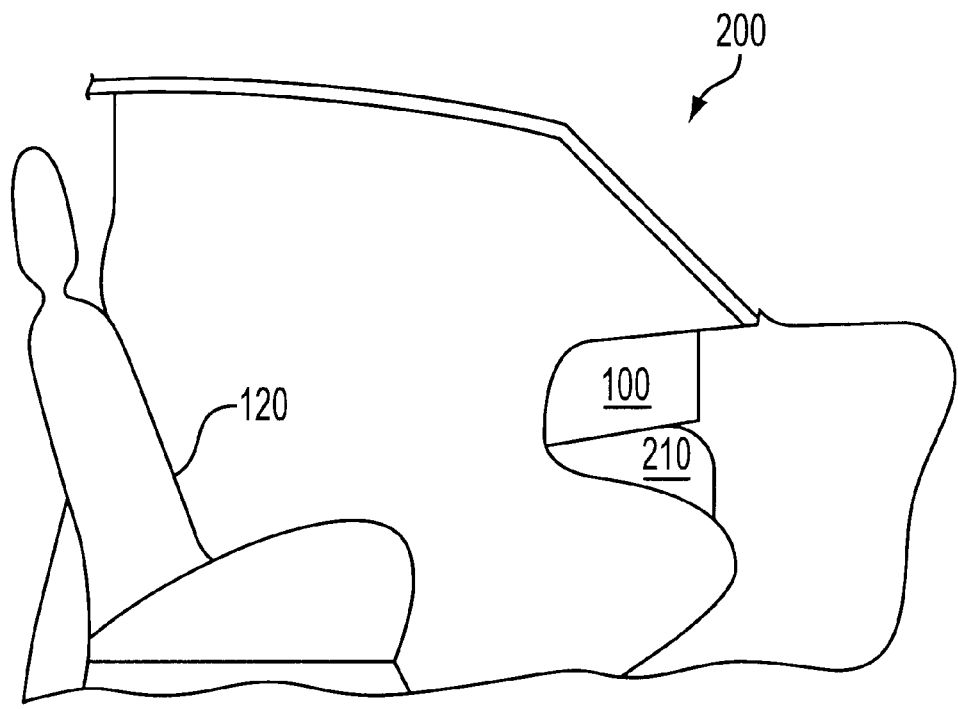
FIG. 2 is a side view of an automobile and the location of the air bag module of the passenger restraint system.

FIG. 1 is an exploded view of an air bag module 100 of a passenger restraint system aligned with respect to a normal axis 110 of the air bag module. As shown in FIG. 2, the air bag module 100 is mounted in the dashboard portion of an automobile 200 above the glove compartment 210 and directly in front of the passenger seat 120.

Figure 3:
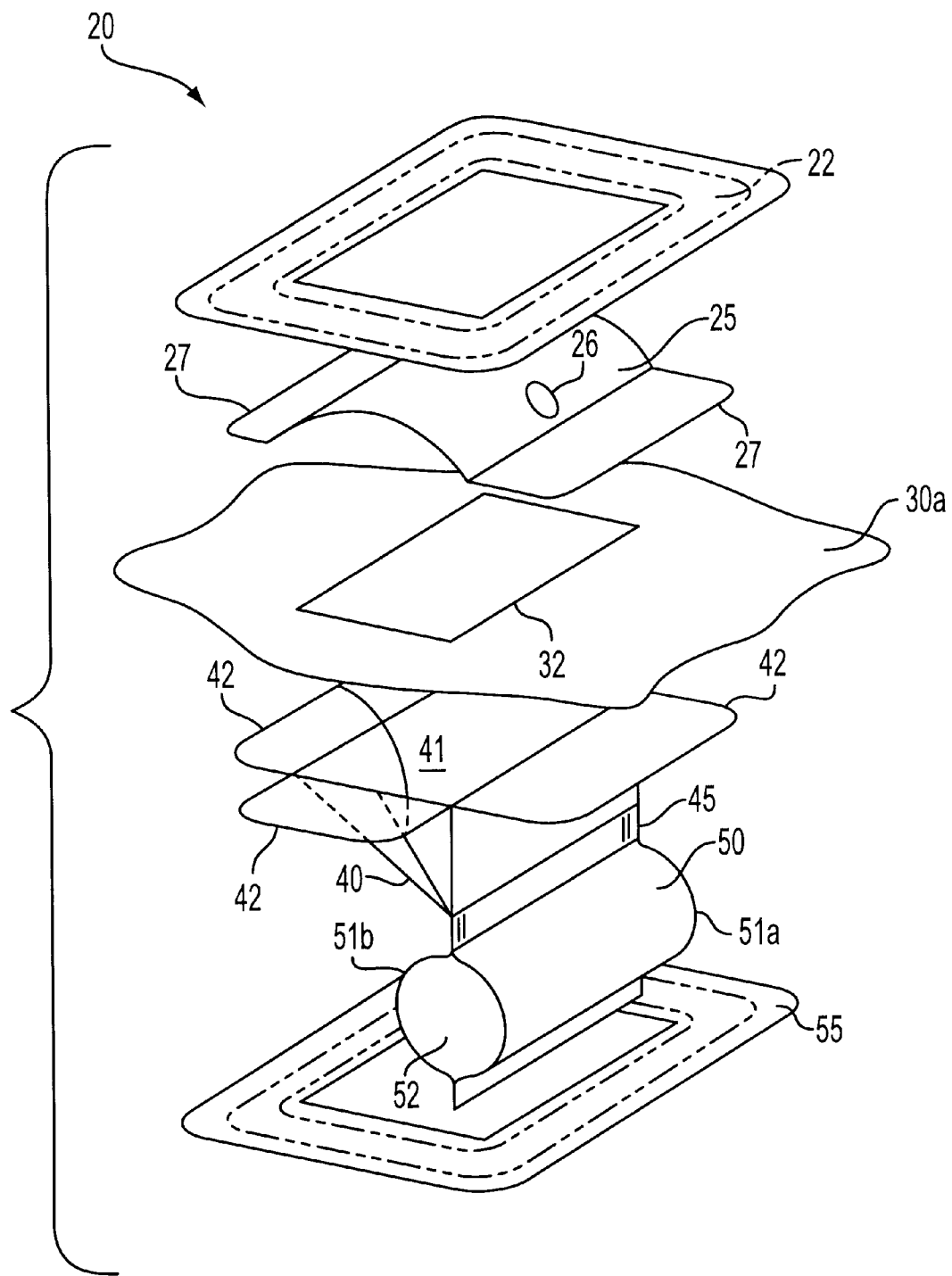
FIG. 3 is an exploded view of the air bag assembly.

The air bag module includes a module cover 10, an air bag assembly 20 including an inflatable air bag 30 and a mouthpiece 50 (nozzle 40 which is hidden from view in FIG. 1 by the folds of the inflatable bag 30, and a diffuser 25 disposed within the inflatable air bag 30, are illustrated in FIG. 3), a retainer 60, an inflator 70, and a nut 80. When the passenger restraint system is activated, the inflator 70 generates pressurized gases which are directed into a defined opening 32 (see FIG. 3) of the inflatable air bag 30 through the nozzle 40 and the diffuser 25. The pressurized gases inflate the inflatable air bag 30 to provide a cushion for the passenger. Blow holes (not shown) are arranged on the inflatable air bag 30 along a surface opposite to the defined opening 32 to facilitate venting of the pressurized gases.

FIGS. 1 and 2 illustrate the air bag assembly 20 which is used as a component of an air bag module for a passenger side of an automobile, but the air bag assembly 20 is not limited to this application. For example, the air bag assembly 20 can be used as a component of an air bag module for a driver side of an automobile or an air bag module installed in side panels of an automobile for protection against side impacts.

The air bag assembly 20 is encased in the retainer 60 by the module cover 10. The module cover 10 is secured to the retainer 60 through a plurality of holes 15 which receive therein a corresponding plurality of tabs 65 of the retainer 60. The inflator 70 is inserted into an opening 52 of the mouthpiece 50 and secured in the retainer 60 by the nut 80. The retainer 60 is also provided with a pair of holes. One of the holes 62 is provided for easy insertion and removal of the inflator 70 and the other hole (not shown) is provided to secure a threaded end 72 of the inflator 70 with the nut 80.

Figure 4:
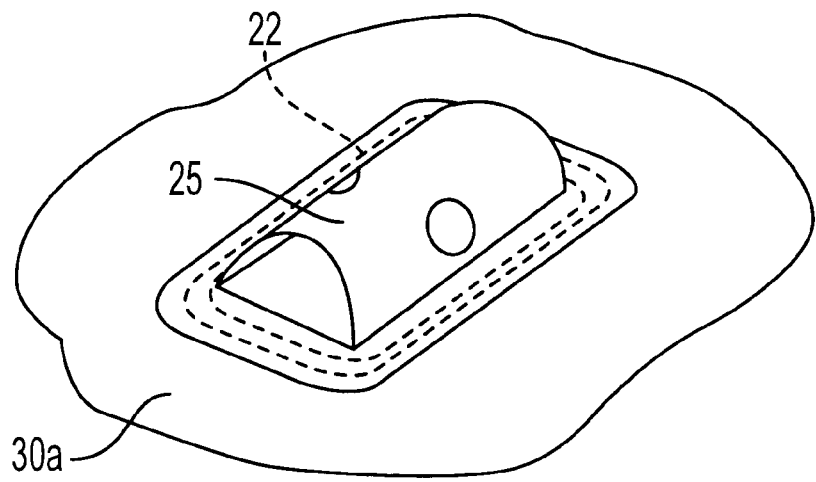
FIG. 4 is an interior view of the air bag assembly and shows the attachment of a diffuser to the inflatable air bag.

FIG. 3 illustrates in more detail the air bag assembly 20. In FIG. 3, the portions above and below the inflatable air bag's rear panel 30a respectively represent the interior and exterior portions of the inflatable air bag 30. The interior patch 22 and the diffuser flaps 27 are stitched to the inflatable air bag's rear panel 30*a* to secure the diffuser 25 integrally at a fixed position at an interior position of the inflatable air bag 30. The diffuser 25 is aligned with a defined opening 32 of the inflatable air bag 30 such that gaseous communication is possible through the defined opening 32 and diffuser openings 26 (only one diffuser opening is shown in FIG. 3; the other diffuser opening is on the opposite side and hidden from view). FIG. 4 illustrates, in an interior cut-away view of the air bag assembly 20, the attachment of the diffuser 25 to the inflatable air bag's rear panel 30*a* by the interior patch 22.

Figure 5:
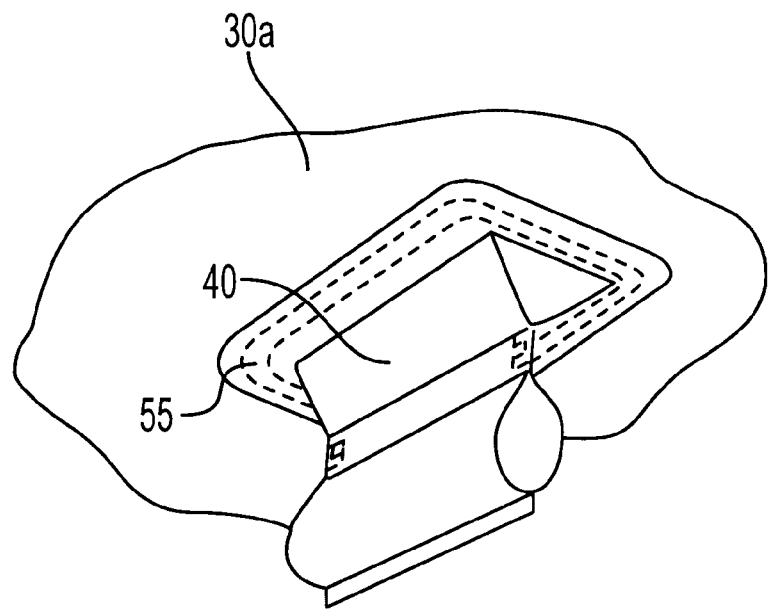
FIG. 5 is a bottom exterior view of the air bag assembly and shows the attachment of a nozzle and a mouthpiece to the inflatable air bag.

The exterior patch 55 and the nozzle flaps 42 are stitched to the inflatable air bag's rear panel 30*a* to secure the nozzle 40 integrally at an exterior position of the inflatable air bag 30. The nozzle is aligned with the defined opening or boundary 32 of the inflatable air bag 30 such that gaseous communication is possible through a nozzle passageway 41 and the defined opening 32. FIG. 5 illustrates, in a bottom exterior cut-away view of the air bag assembly 20, the attachment of the nozzle 40 integrally to the inflatable air bag's rear panel 30*a* by the exterior patch 55.

At the lower end of the nozzle 40 is a nozzle neck 45 from which the mouthpiece 50 extends. The nozzle neck 45 functions as a nozzle inlet through which pressurized gases generated from the inflator 70, which is arranged within the opening 52, flow into the nozzle neck 45.

Figure 6:
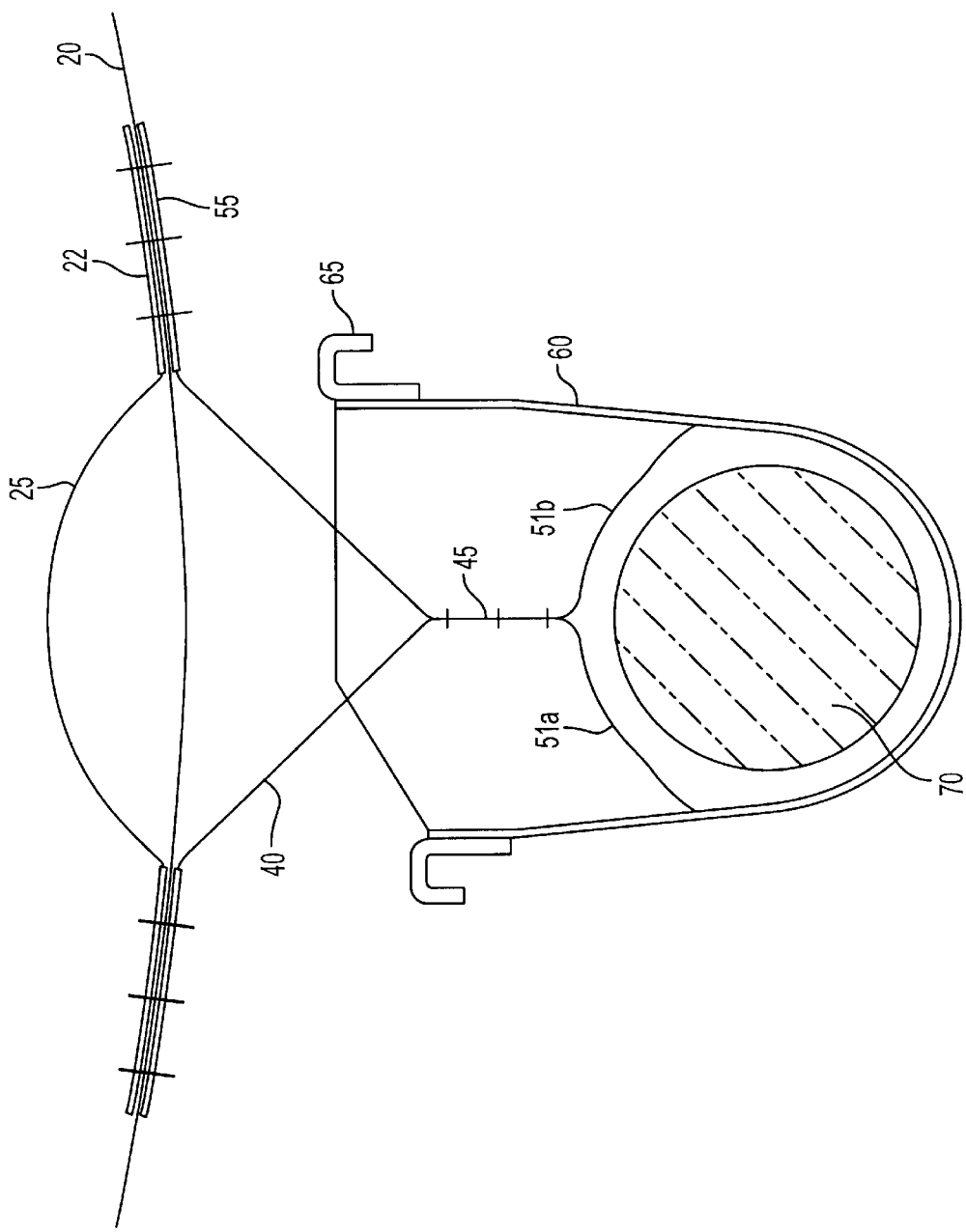
FIG. 6 is a cross-sectional view of the air bag assembly according to a first embodiment of the invention.

The mouthpiece 50 consists of a pair of opposing members, or first and second portions, 51*a* and 51*b*, each of which has first and second ends, stitched together with the nozzle neck 45 at one end, the respective first ends, and with each other at the other end, or second ends. Alternatively, the first and second opposing members or portions 51*a* and 51*b* are stitched together at one end with the nozzle neck 45 but, at the other end, the opposing members or portions 51*a* and 51*b* are respectively attached to the inside wall of the retainer 60 as shown in FIG. 6.

All of the components of the air bag assembly 20, including the nozzle 40, and the mouthpiece 50, are made from a sheet of fabric, for example, Tyvek. For this reason, they are flexible and can thus be folded in a variety of different patterns and housed within retainers of various types. In the preferred embodiment, the nozzle 40, the nozzle flaps 42, the nozzle neck 45, the mouthpiece 50 are formed from a single sheet of fabric and are coated with silicon.

It is also envisioned that the components of the air bag assembly 20 can be made of different sheets of fabric or of a different type of material altogether. For example, the nozzle 40, the mouthpiece 50, or both, may be made of any type of flexible material, such as plastic with a relatively thin cross-sectional dimension.

Figure 7:
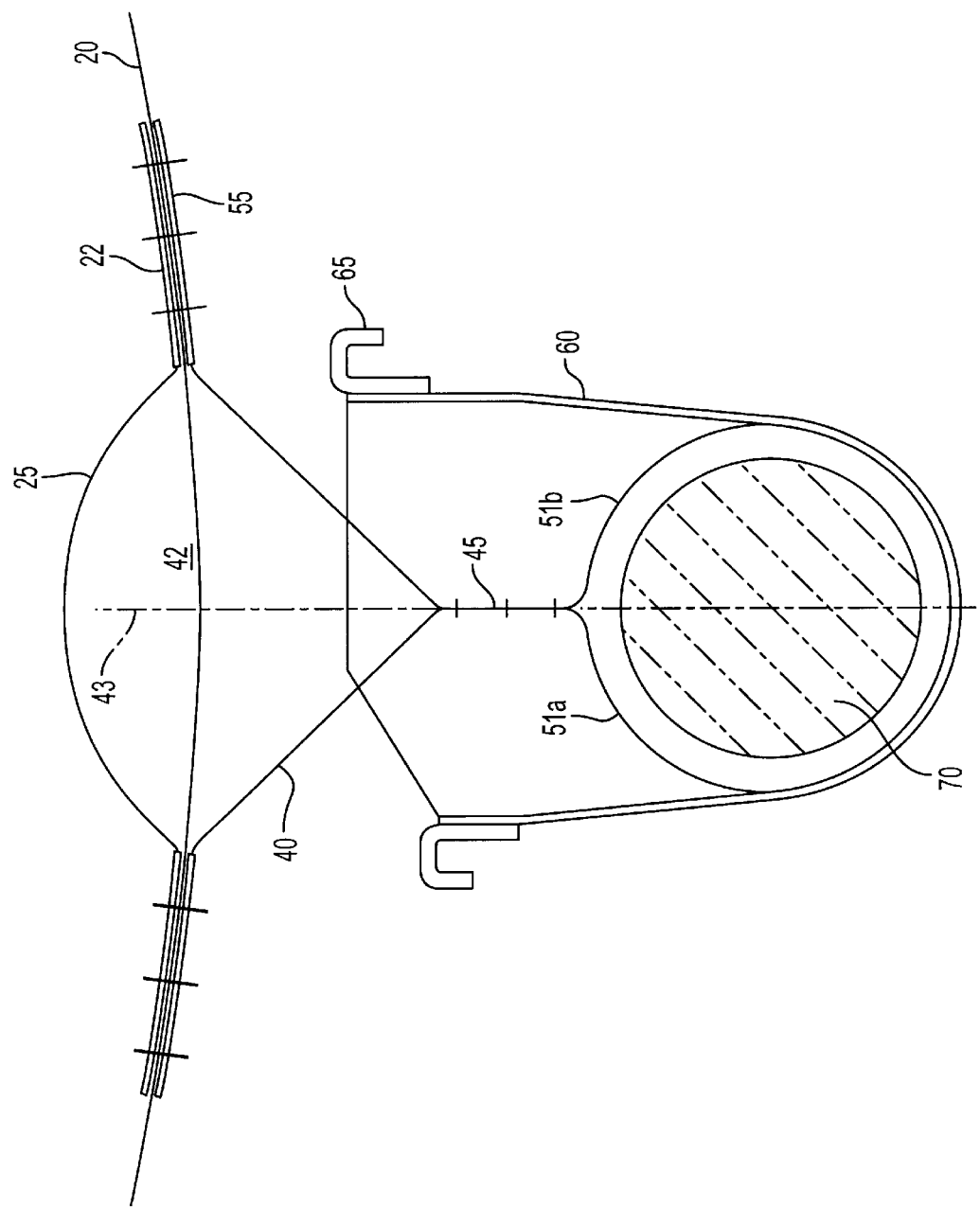
FIG. 7 is a cross-sectional view of the air bag assembly according to a second embodiment of the invention.
Figure 8:
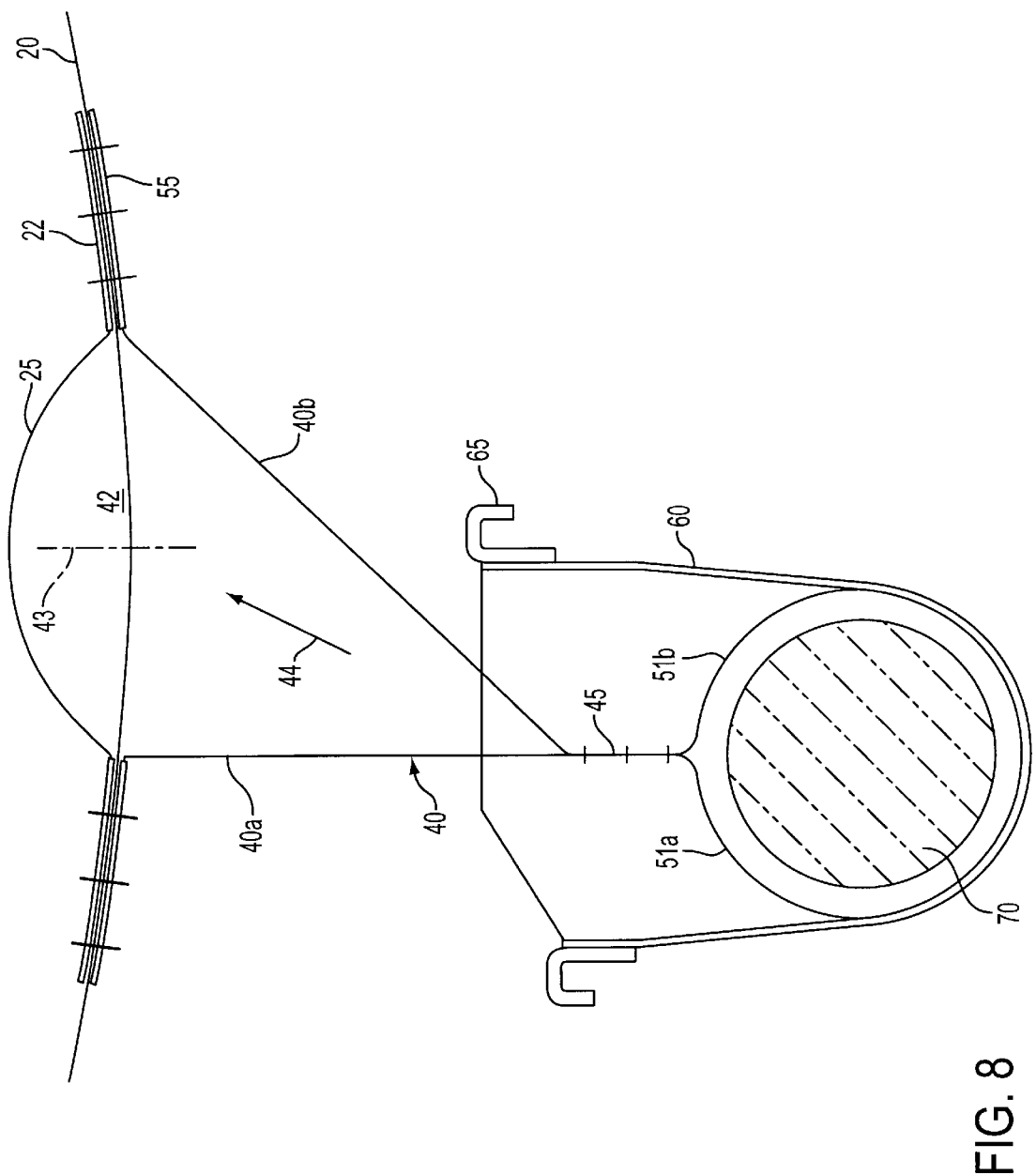
FIG. 8 is a cross-sectional view of the air bag assembly according to a third embodiment of the invention.

FIG. 7 is a partial cross-sectional view of the air bag assembly 20 in an inflated condition, wherein the nozzle 40 is formed symmetrically with respect to an axis 43 which is normal to the defined opening 42 of the inflatable air bag. Alternatively, the nozzle 40 may be formed asymmetrically with respect to the axis 43 which is normal to the defined opening 42 of the inflatable air bag 20 as illustrated in FIG. 8. As a result of the asymmetric arrangement, side 40*a* of the nozzle 40 is shorter than side 40*b* of the nozzle 40 and the direction (indicated by arrow 44) of the pressurized gas flow through the nozzle is at an oblique angle with respect to the defined opening 42 of the inflatable air bag 20. It is also noted here that the nozzle 40 illustrated in FIG. 3 corresponds to the asymmetric nozzle 40 of the alternative embodiment.

The folds of the inflatable air bag 30 can be provided in a variety of different patterns. FIG. 1 illustrates the folds in a vertically undulating pattern. The folds as shown in FIG. 1 can be arranged vertically in such a manner that they are substantially parallel to a normal axis of the air bag module 100. There are other folding patterns which are possible using the air bag assembly according to the invention. FIGS. 9A–9D illustrate four different ways the inflatable air bag 30 can be folded within the air bag module 100.

Figure 9A:
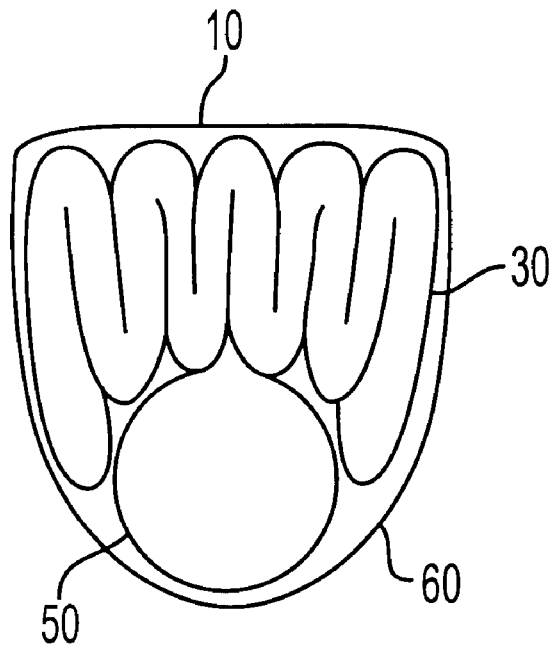
FIGS. 9A–9D illustrate four different ways the inflatable air bag can be folded within the air bag module.
Figure 9B:
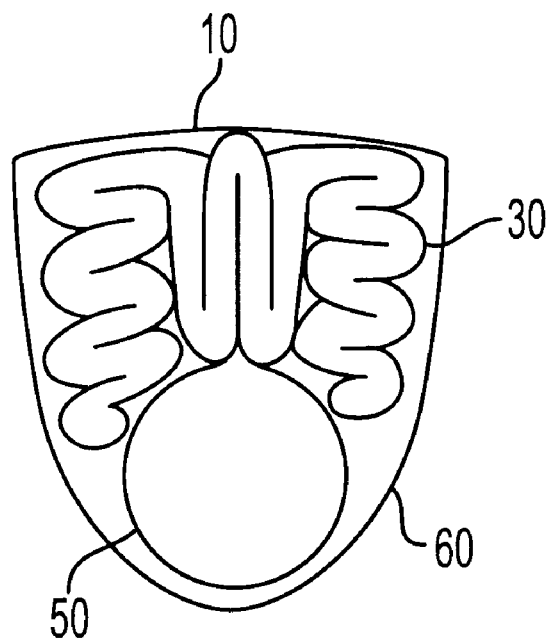
Figure 9C:
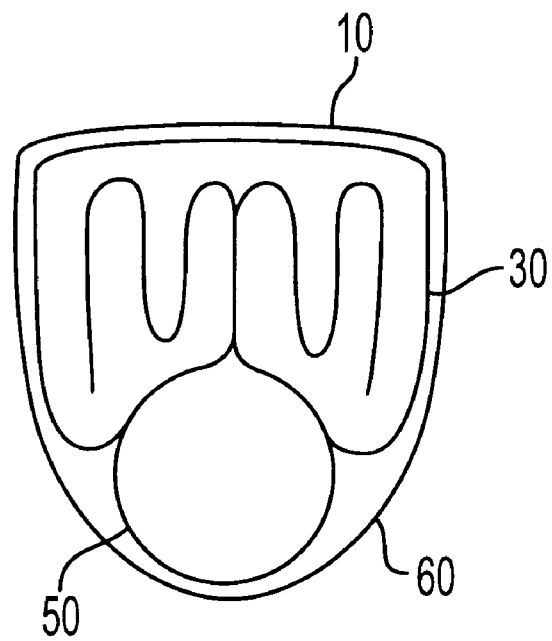
Figure 9D:
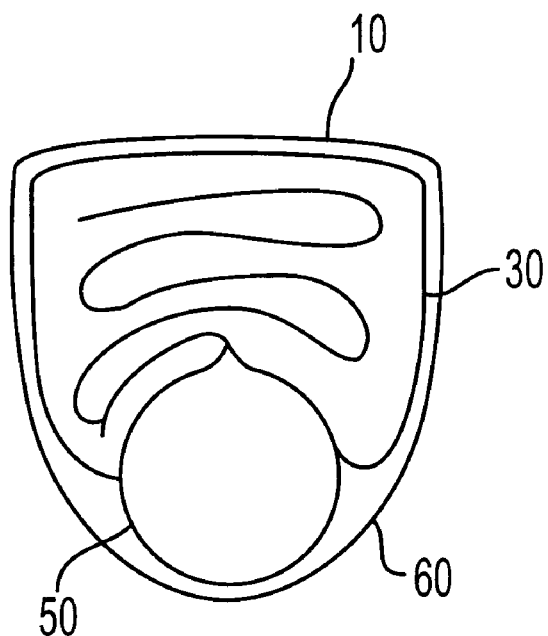

FIG. 9A is substantially the vertically undulating pattern shown in FIG. 1. FIG. 9B is a combination pattern which includes both vertically and horizontally undulating, or substantially parallel and perpendicular, patterns. FIGS. 9C and 9D respectively illustrate interlocking patterns in a vertical and a horizontal direction.

While particular embodiments according to the invention have been illustrated and described above, it will be clear that the invention can take a variety of forms and embodiments within the scope of the appended claims.

I claim:

1. An air bag assembly, comprising:

an inflatable bag including an exterior, an interior, and an entrance with a defined boundary;

a nozzle including an inlet and an outlet, the outlet being integrally attached to the inflatable bag so that the outlet surrounds the defined boundary and so that the nozzle is disposed on the exterior of the bag, the nozzle being disposed asymmetrically with respect to an axis normal to the defined boundary; and a mouthpiece having a first portion and a second portion, each of the first portion and second portion having a first end and a second end, the first ends of the first portion and second portion being connected to the inlet of the nozzle.

2. The air bag assembly recited in claim 1, further comprising a diffuser integrally attached to the inflatable bag so that the diffuser surrounds the defined boundary and is disposed on the interior of the inflatable bag.

3. The air bag assembly recited in claim 1, wherein the second ends of the first portion and the second portion are secured to each other.

4. An air bag assembly of an air bag module, said assembly comprising:

an inflatable bag having an entrance; and a flexible nozzle disposed at an exterior of the inflatable bag and having an outlet connected with the entrance of the inflatable bag such that pressurized gas is transmitted into the inflatable bag through the flexible nozzle;

wherein the flexible nozzle has a shape which is asymmetric with respect to an axis normal to the entrance.

5. The air bag assembly recited in claim 4, further comprising a mouthpiece connected with an inlet of the nozzle, the mouthpiece including a first portion and a second portion, each of the first portion and the second portion having a first end and a second end, the first ends of the first portion and second portion being connected with the inlet of the nozzle.

6. An air bag assembly of an air bag module, said assembly comprising:

an inflatable bag having an entrance, wherein folds of the inflatable bag are parallel to a normal axis of said air bag module; and a flexible nozzle disposed at an exterior of the inflatable bag and having an outlet connected with the entrance of the inflatable bag such that pressurized gas is transmitted into the inflatable bag through the flexible nozzle.

7. The air bag assembly recited in claim 6, wherein the folds are in an undulating pattern.

8. The air bag assembly recited in claim 6, wherein the folds are in an interlocking pattern.

9. An air bag assembly of an air bag module, said assembly comprising:
- an inflatable bag having an entrance, wherein the folds are in a combination undulating pattern including folds which are parallel to a normal axis of said air bag module and folds which are perpendicular to the normal axis of said air bag module; and
- a flexible nozzle disposed at an exterior of the inflatable bag and having an outlet connected with the entrance of the inflatable bag such that pressurized gas is transmitted into the inflatable bag through the flexible nozzle.

10. A passenger restraint system, comprising:
- an inflatable air bag having an entrance; and
- a nozzle disposed at an exterior of the inflatable bag and having a shape which is asymmetric with respect to an axis normal to the entrance, an outlet of the nozzle being connected with the entrance of the inflatable bag such that pressurized gas is transmitted into the inflatable air bag from the nozzle at an oblique angle with respect to the entrance.

11. The passenger restraint system as recited in claim 11, wherein said nozzle is flexible.

12. The passenger restraint system as recited in claim 11, wherein said nozzle is fabric.

13. The passenger restraint system as recited in claim 12, further comprising a fabric mouthpiece integrally formed from a same sheet of fabric as the nozzle.

14. The passenger restraint system as recited in claim 13, further comprising a diffuser attached at an interior of the inflatable air bag so that the diffuser surrounds the entrance of the inflatable air bag.

15. The passenger restraint system as recited in claim 14, wherein the mouthpiece is adapted to receive an inflator therein so that pressurized gases injected from the inflator enter the nozzle through the nozzle inlet and the inflatable air bag through the nozzle outlet.

16. The passenger restraint system as recited in claim 13, further comprising:
- a retainer having an opening adapted to receive the inflatable air bag, the nozzle, and the mouthpiece;
- a cover which is detachable to the retainer; and
- an inflator arranged within the retainer.

17. An automobile comprising a passenger restraint system including an inflatable air bag having an entrance for receiving pressurized gas, and a nozzle disposed at an exterior of the inflatable bag, the nozzle having a shape which is asymmetric with respect to an axis normal to the entrance and an outlet which is connected with the entrance of the inflatable bag such that pressurized gas is transmitted into the inflatable air bag from the nozzle at an oblique angle with respect to the entrance.

18. The automobile recited in claim 17, wherein the nozzle is flexible.

19. The automobile recited in claim 18, wherein the nozzle is fabric.

20. The automobile recited in claim 19, further comprising a mouthpiece connected with an inlet of the nozzle, the mouthpiece including a first portion and a second portion, each of the first portion and the second portion having a first end and a second end, the first ends of the first portion and second portion being connected with the inlet of the nozzle.

* * * * *